(12) United States Patent
Peng et al.

(10) Patent No.: US 7,405,501 B2
(45) Date of Patent: Jul. 29, 2008

(54) ELECTRIC GENERATOR

(75) Inventors: Wen-Yang Peng, Hsinchu County (TW);
Fuh-Yu Chang, Hsinchu County (TW);
Ching-Hsiang Cheng, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 11/586,616

(22) Filed: Oct. 26, 2006

(65) Prior Publication Data

US 2008/0048530 A1 Feb. 28, 2008

(30) Foreign Application Priority Data

Aug. 25, 2006 (TW) ............................... 95131239 A

(51) Int. Cl.
*H02K 11/00* (2006.01)

(52) U.S. Cl. .................................. 310/67 A; 310/75 C

(58) Field of Classification Search ................... 310/67, 310/67 A, 251, 257, 266–268, 216, 156.32–156.37, 310/75 C, 263
See application file for complete search history.

(56) References Cited

U.S. PATENT DOCUMENTS

| | | | | |
|---|---|---|---|---|
| 4,635,351 | A * | 1/1987 | Koch et al. .................. 29/598 |
| 5,769,750 | A | 6/1998 | Rickels et al. | |
| 5,813,937 | A | 9/1998 | Rickels et al. | |
| 6,087,755 | A * | 7/2000 | Suzuki et al. ............... 310/254 |
| 6,225,727 | B1 | 5/2001 | Oohashi et al. ............. 310/263 |
| 6,384,503 | B1 * | 5/2002 | Iwaki et al. .............. 310/156.47 |
| 6,455,978 | B1 * | 9/2002 | Krefta et al. ............... 310/263 |
| 6,559,564 | B1 * | 5/2003 | Itou ......................... 310/67 A |
| 6,744,156 | B2 * | 6/2004 | Doi .......................... 310/49 R |
| 6,756,719 | B1 * | 6/2004 | Chiu ......................... 310/257 |
| 6,794,783 | B2 * | 9/2004 | Tu et al. ................. 310/156.32 |
| 6,853,112 | B2 * | 2/2005 | Nakamura et al. .......... 310/263 |
| 6,946,771 | B2 * | 9/2005 | Cros et al. .................. 310/257 |
| 2002/0096961 | A1 * | 7/2002 | Chuang et al. .............. 310/216 |
| 2003/0062801 | A1 * | 4/2003 | Aoshima .................... 310/261 |
| 2004/0013542 | A1 | 1/2004 | Sun | |
| 2004/0135452 | A1 * | 7/2004 | Tu et al. ................. 310/156.32 |

(Continued)

FOREIGN PATENT DOCUMENTS

DE 4229113 A1 * 3/1993

(Continued)

*Primary Examiner*—Thanh Lam
(74) *Attorney, Agent, or Firm*—Birch, Stewart, Kolasch & Birch, LLP

(57) ABSTRACT

An electric generator is disclosed, which comprises: at least a magnet, each having more than two poles; and at least a claw-pole set, each being composed of an inner claw-pole and an outer claw-pole; wherein, the inner claw-pole and the outer claw-pole are interlaced arranged and used for guiding magnetic flux; the inner claw-pole is connected to an iron core whose outer diameter is smaller than the magnet and thus the loop of the inner claw-pole and the outer claw-pole is conducted; the core is winded by a solenoid coil; the number of claws of the inner claw-pole is the half of the pole number of the magnet while the outer claw-pole is the same, so that, as the magnet is move relative to the claw-pole set, the magnetic flux passing through the solenoid coil will change continuously and thus an induction electromotive force is generated.

23 Claims, 11 Drawing Sheets

U.S. PATENT DOCUMENTS

| | | |
|---|---|---|
| 2005/0029900 A1* | 2/2005 | Hiramatsu .................. 310/268 |
| 2005/0073212 A1* | 4/2005 | Semones et al. ............ 310/216 |
| 2005/0146233 A1* | 7/2005 | Miyawaki ................. 310/49 R |
| 2005/0194855 A1* | 9/2005 | Hasebe et al. .......... 310/156.43 |
| 2005/0236914 A1* | 10/2005 | Horiike .................... 310/49 R |
| 2005/0285467 A1* | 12/2005 | Shimizu ................ 310/156.35 |
| 2006/0028085 A1* | 2/2006 | Qu et al. ..................... 310/178 |
| 2006/0091743 A1* | 5/2006 | Iwasaki et al. ................ 310/58 |
| 2006/0175927 A1* | 8/2006 | Yoshida ..................... 310/257 |
| 2006/0273670 A1* | 12/2006 | Tung et al. ................ 310/67 R |

FOREIGN PATENT DOCUMENTS

| | | |
|---|---|---|
| DE | 10157137 A1 * | 5/2003 |
| EP | 1467471 A1 * | 10/2004 |
| JP | 2004350492 A * | 12/2004 |
| JP | 2006-014538 B | 1/2006 |
| TW | 092137088 B | 7/2005 |
| TW | 094109740 B | 1/2006 |

* cited by examiner

Coil:400T

Magnet Outer Diameter:60mm    Pole Number:20

Magnet Material:NdFeB    Magnet Thickness:2mm

| Rotation Speed (RPM) | Single-sided magnet Total Induced Voltage | Dual-sided magnet Total Induced Voltage |
|---|---|---|
| 30 | 2.0 | 5.9 |
| 45 | 2.8 | 9 |
| 60 | 3.8 | 12 |
| 90 | 5.6 | 17 |
| 120 | 8.4 | 22 |
| 150 | 9.5 | 29 |
| 180 | 11.9 | 35 |

ELECTRIC GENERATOR

FIELD OF THE INVENTION

The present invention relates to an electric generator, and more particularly, to a compact, ease-to-fabricated electric generator with simplified design, which is substantially a flat multi-pole magnet of disc shape or other geometrical shape, being integrally formed with an iron core working cooperatively with a claw-pole set arranged wrapping a solenoid coil, so that its voltage output is satisfactory even when operating at low rotation speed and thus is suitable to be used in applications and manufacturing relating to electric generators.

BACKGROUND OF THE INVENTION

As the call for reducing battery usage is becoming popular, the need for miniaturized high-performance electric generators has emerged. One such device is the hub-type dynamo for bicycles, which is considered to be an artistic electric generator design producing reasonable small resistance. According to specifications relating to bicycle illumination, the dynamo, received in the limited space of a bicycle hub, is required to drive a 12 ohm light bulb to illuminate slightly when the bicycle is cruising at a low speed, i.e. about 5 km/h, and to suppress the raising of voltage outputted when cruising at a higher speed. Thus, when designing a hub-type dynamo, multi-pole structure is most popular.

The common hub-type dynamo is originated from the coaxial multi-pole hub design of Sturmey-Archer bicycle hub. One such design can be seen in both U.S. Pat. No. 5,769,750, entitled "Epicyclic change gear system", and U.S. Pat. No. 5,813,937, entitled "Epicyclic change speed gear system", respectively claimed priority to GB Pat. No. 9409844 and 9304189. Such coaxial multi-pole hub is characterized in that: a plurality of poles are provided and arranged in an alternating manner while enabling the plural poles to be wrapped by a tube-like magnet, and is vastly implemented by various electric generators. One such application is seen in TW Pat. No. 94109740, entitled "Hub-type dynamo and bicycle", also claimed priority to JP Pat. No. 2004-190663, in which a hub-type dynamo 10 is disclosed, as seen in FIG. 1 and FIG. 2. The hub-type dynamo 10 is comprised of: a permanent magnet 14, arranged inside a shell 12 of the dynamo 10; and a spindle 11; wherein the spindle further comprise: a plurality of poles 74, 75, arranged in a manner enabling the polar of each pole to be faced toward that of the permanent magnet 14; two stator pins 16, 17, arranged on the circumference thereof; and a coil 22, arranged between the two stator pins 16, 17. By the use of two positioning components 30, 31, arranged on the spindle 11, to hold and fix the stator pins 16, 17 in respective, the two stator pins 16, 17 are fixed to the spindle 11. Moreover, the fixing of the two stator pins 16, 17 on the spindle 11 is characterized in that: there is a recess hole 15 formed in each stator pin 16, 17 while enabling each recess hole 15 to channel with a hole 13 bored through the spindle 11; and there is an insulator arranged between each stator pin 16, 17 and its corresponding positioning component 30, 31 for preventing the crossing of electricity from an electricity-conducting member, placed next to each positioning component 30, 31, to the stator pins 16, 17. The aforesaid coaxial multi-pole electric generator is further characterized in that: by the forming of such recess hole 15, the generation of eddy current can be prevented and thus the efficiency of the electric generator is improved. However, although the generators with coaxial multi-pole design are popular and vastly adopted, it has shortcomings listed as following:

(1) The magnet is shaped like a tube and is warping around the stator pins that cause the resulting electric generator to be bulky and costly.

(2) The plural poles will guide and cause the corresponding magnetic lines to defect more than twice that cause the magnetic flux passing through the coil to drop.

(3) As each stator pin shall have a specific 3-D shape and each magnetic line is deflected more than twice, and moreover, the magnetic fields between the plural poles are easily to interfere with each other, the overall electric generation efficiency is low.

Please refer to FIG. 3, which is a hub-type dynamo disclosed in TW Pat. No. 92137088. The hub-type dynamo of FIG. 3 is comprised of a hub 2, a coil seat 3, a coil structure 4, an iron core 5, a casting set 6, two magnetic blocks 7 and a bearing axle 8. Moreover, a conventional hub-type dynamo 1 is also disclosed in TW Pat. No. 92137088, as shown in FIG. 4, which is comprised of a hub 11, a coil seat 12, a coil structure 13, an iron core 14, a casting set 15, a magnetic ring 16 and a bearing axle 17. As disclosed in the Taiwan patent, the conventional hub-type dynamo 1 has two shortcomings. One of which is that the size of the conventional hub-type dynamo 1 can not be reduced effectively since the iron core 14, the coil structure 12, the coil seat 13, the casting set 15 and the magnetic ring 16 are being received in the hub 11 from inside out and in a layer-by-layer manner. Another is that, since the iron core 14 is substantially a silicon steel lamination that is formed by stacking a plurality of silicon steel sheets 141 in a one-by-one manner, the formation and installation of the iron core 14 is complicated that it is time-consuming and uneconomical. With reference to the shortcomings of the conventional hub-type dynamo 1, the hub-type dynamo 2 adopted the two magnetic blocks 7, instead of using a conventional tube-like magnet, while enabling the two to be placed along the axial direction X respectively at the two sides of the casting set 6, so that the diameter of the hub 2 and volume thereof can be reduced. It is noted that the reduced diameter should be twice the thickness of the magnet. In addition, comparing the hub-type dynamo of FIG. 3 with that of FIG. 4, not only the magnetic ring 16 is replaced and substituted by the two magnetic blocks 7, but also the appearances of the two casting sets 6, 17 are totally different. Although each component of the casting set 6 of FIG. 3 is constructed with a plurality of radially extended claws, each of the plural claws is not bended. That is, as the two components of the casting set 6 is placed respectively at the two sides of the coil structure 4 along the axial direction, the claws of one component will not interlace with those of another component, which has nothing in common with the conventional casting set 15. For those skilled in the art, the design of the aforesaid casting set 6 is serious defected and is not realistic. It is noted that as the way the claws being arranged, only half the surface area of each magnetic block 7 can be utilized, moreover, there will be circuits happening between the unused magnetic block 7 and the casting set 6, and thus the efficiency of electricity generation is severely reduced. As for the formation and installation of the conventional iron core 14, it is solved in the Taiwan patent by previously using a pin 52 to hold and position the plural steel sheets 51 into an iron core 5 so that the installation of the iron core 5 can be facilitated. However, for those skilled in the art, the aforesaid solution is also not realistic. As seen in FIG. 4, the direction of the stacking of the plural silicon steel sheets 141 to form the conventional iron core 14 is perpendicular to the magnetic lines, i.e. the X direction, by which the iron core 14 can have good permeance and such stacking is common in devices such as transformers and motors, etc. However, the direction of the stacking of the plural silicon steel sheets 51 to form the iron core 5 is parallel to the X direction, by which the hysteresis loss and eddy current loss are increased. Therefore, it is not a good idea to cause a serious efficiency drop just for reducing volume and simplifying assembly, as the hub-type dynamo disclosed in TW Pat. No. 92137088.

Please refer to FIG. 5, which shows a flat rotary electric generator disclosed in U.S. Pub. No. 20040135452. In FIG. 5, as a toroidal coil structure 1 is sandwiched between two matching disc-shaped magnetic pole structures 2 and as the dimension of the winding of the toroidal coil structure 1 is restricted and limited, when multi-pole design is adopted while enabling each pole to be a section of one disc-shaped magnetic pole structures 2 bounded by two radii, the volume enclosed within the two matching sections respectively of the two matching disc-shaped magnetic pole structures 2 is also restricted and must be considered. Therefore, the overall diameter of the flat rotary electric generator can not be reduced effectively. In addition, the overall size is required to be increase when it is intended to have high efficiency. Thus, the aforesaid flat rotary electric generator can not be miniaturized while increasing power density.

From the above description, it is noted that as the hub-type dynamo can be easily integrated with the roller brake that is suitable to be applied in the mass production of bicycle, the improvement of the efficiency of the hub-type dynamo while reducing the cost thereof can be a great boost for bicycle industry, as well as other applications requiring portable power generator. Moreover, as hub-type dynamo is common in the magnetic resistance system of currently available fitness bicycle, it is preferred to have a highly efficient hub-type dynamo in the fitness bicycle since not only the power generating efficiency is improved, but also the cost can be reduced. In addition, a miniature power generator, being the improvement over the hub-type dynamo, is in great need, since it can be received in pocket, shoe sole, glasses, watch, etc., to be used as backup or emergency power for those portable electronic devices, such as RF radio, or cellular phone, and so on. Therefore, it is required to have a cheap, small-sized electric generator capable of generating sufficient power.

SUMMARY OF THE INVENTION

In view of the disadvantages of prior art, the primary object of the present invention is to provide a compact, ease-to-fabricated electric generator with simplified design, which is substantially a flat multi-pole magnet of disc shape or other geometrical shape, being integrally formed with an iron core working cooperatively with a claw-pole set arranged wrapping a solenoid coil, so that its voltage output is satisfactory even when operating at low rotation speed.

To achieve the above object, the present invention provides an electric generator, which comprises:

at least a magnet, each having more than two poles;

at least a claw-pole set, each being composed of an inner claw-pole and an outer claw-pole;

an iron core, connected to each inner claw-pole for enabling loops of the inner claw-poles and the outer claw-poles to be conducted; and a solenoid coil, winding on the outside of the iron core;

wherein, the inner claw-pole and the outer claw-pole are interlaced arranged and used for guiding magnetic flux.

Preferably, each magnet is a flat disc with a plurality of poles, each being arranged at a radial section while surrounding the center of the disc.

Preferably, the outer diameter of the iron core is smaller than that of the magnet and each inner claw-pole is extending outwardly and radially from the iron core.

Preferably, each magnet is independently arranged, and an interfacing part is substantially a ring structure having an inner side connected to the iron core and an outer side connected to the outer claw-pole, while the inner side and the outer side are interconnected with each other, thereby, a magnetic circuit is formed by the magnet, the iron core, the inner claw-pole and the outer claw-pole.

Preferably, a space is formed between the inner side and the outer side of the interfacing ring and used for receiving the solenoid coil.

Preferably, each magnet is a multi-pole magnet of biased pole magnetization.

Preferably, each magnet is composed of two magnetic pieces, being spaced apart by an interval while enabling each to correspond to one claw-pole set.

Preferably, one of the two magnetic pieces is connected to an axial end of a hollow tube-like first connecting part while another magnetic piece is connected to another axial end, so that the two magnetic pieces can be driven to rotate synchronously by the first connecting part.

Preferably, an axial end of a second connecting part is connected to the outer claw-pole of one claw-pole set of the at least a claw-pole set while another axial end of the second connecting part is connected to the outer claw-pole of another claw-pole set of the at least a claw-pole set, so that the two outer claw-poles can be driven to rotate synchronously by the second connecting part. Moreover, the outer diameter of the second connecting part is smaller than the inner diameter of the first connecting part.

Preferably, a space is formed between the second connecting part and the iron core and used for receiving the solenoid coil.

Preferably, each claw-pole set is made of a material selected from the group consisting of iron, silicon iron, silicon steel, and the combination thereof.

Preferably, the iron core is made of a material selected from the group consisting of iron, silicon iron, silicon steel, and the combination thereof.

Preferably, the inner claw-pole and the outer claw-pole are integrally formed/stacking formed with an inner/outer tube by a metallic process selected from the group consisting of a stamping process, a casting process.

Preferably, any one of the outer claw-pole and the inner claw-pole is a stacking of a plurality of silicon steel sheets.

Preferably, the width, length and thickness of different inner/outer claw-poles are different; and the width, length and thickness of the inner claw-pole and the outer claw-pole of the same claw-pole set can be different.

Preferably, the outer claw-pole is a cone-shape part tapering from the edge of the outer tube toward the axial center of the same; and the inner claw-pole is a fan-shaped part radially expanding from the edge of the inner tube.

Preferably, the magnet is a multi-pole magnet made of a permeance material selected from the group consisting of NdFeB, SmCo, Hard Ferrite, AlNiCo, and the like.

Preferably, the number of claws of the inner claw-pole is the half of the pole number of the magnet while the outer claw-pole is the same.

Preferably, the magnet can be a single-sided magnet or a dual-sided magnet.

Preferably, the geometrical shape of each pole of the magnet is conforming to that of the inner/outer claw-pole.

Preferably, when the inner/outer claw-pole is rotated radially by a helix angle, each pole of the magnet is twisted for magnetizing the pole with respect to the radius and angle of each pole.

Preferably, the electric generator further comprises at least a back panel set. Each back panel set further comprises:

an iron back, arranged at a side of the magnet opposite to that proximate to the claw-pole set, for enabling the closing of magnetic lines;

a fixation cap, axially arranged at the center of the iron back and the magnet while enabling an end of the fixation cap to abut against the iron core;

a bearing, ensheathing the fixation cap; and a bearing cap, wrapping the bearing;

wherein, the bearing cap is screw-fixed to the iron back by screws, and thus the magnet, the iron back, the bearing, the bearing cap, and the fixation cap are assembled.

Preferably, the fixation cap is axially extending by a specific length for enabling the same to abut against the iron core while maintaining the magnet to be spaced from the inner/outer claw-pole by a specific distance.

Preferably, the iron back is made of a permeance material selected from the group consisting of iron, ferro-cobalt alloy, Ni—Fe alloy, silicon iron and the combination thereof.

Preferably, the at least one claw-pole set are serially connected while the at least one back panel are axially arranged at the two outer sides of the magnet.

Preferably, the iron back and the bearing cap are integrally formed.

Preferably, a side of the claw-pole set opposite to the magnet is embedded with slender metal bars for attracting magnetic lines of the claw-pole set to flow therethrough and thus causing comparatively stronger magnetic flux density to the solenoid coil.

Preferably, a plurality of connecting parts, being interconnected with each other serially or in parallel, are arranged between the outer claw-pole and the iron core for enabling electricity generated by the electric generator to be outputted.

Preferably, each connecting part is made of a material selected from the group consisting of iron, silicon iron, silicon steel and the combination thereof.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

To further understand and recognize the fulfilled functions and structural characteristics of the invention, several preferable embodiments cooperating with detailed description are presented as the follows.

Figure 6:
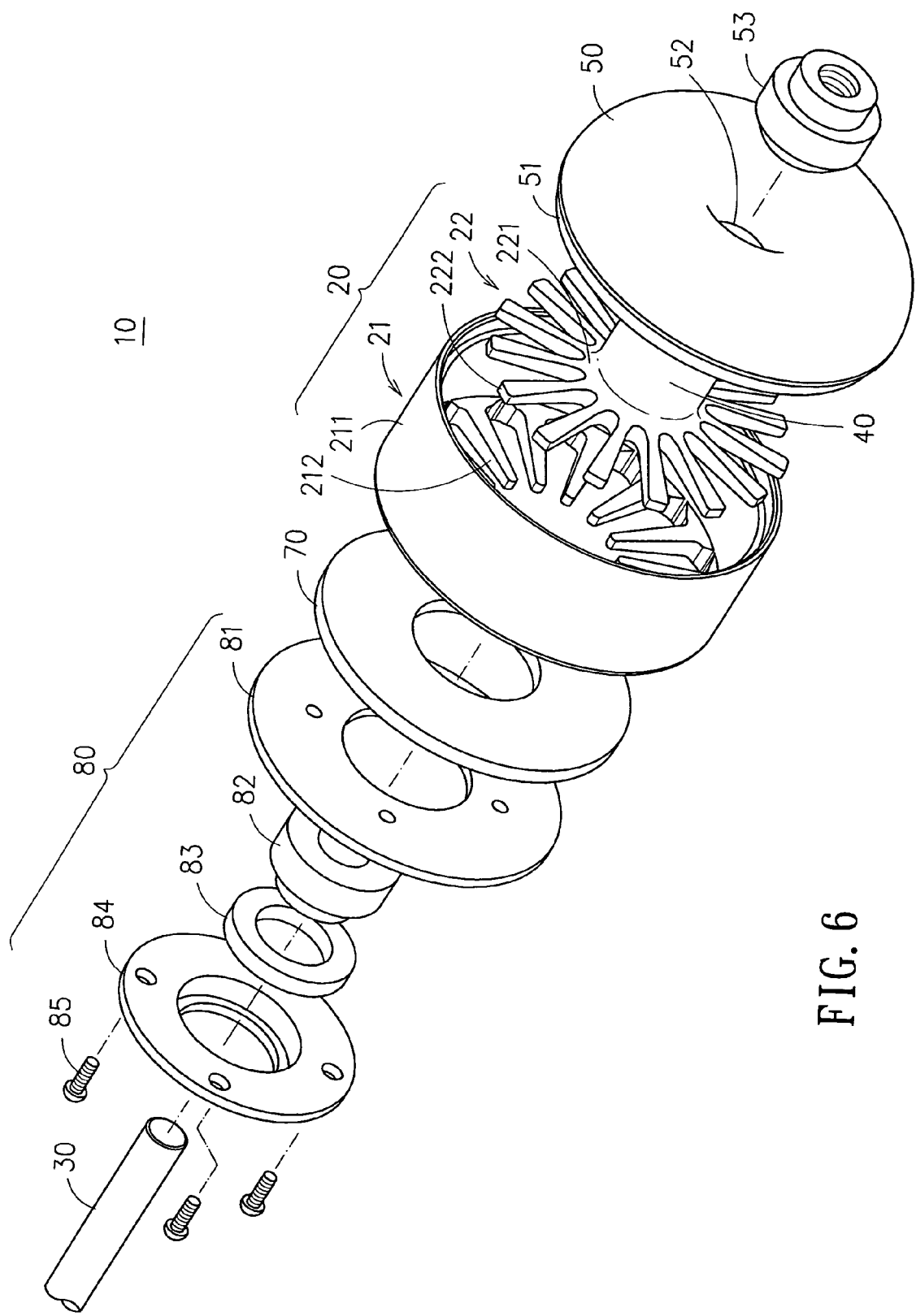
FIG. 6 is an explode diagram depicting an electric generator according to a first preferred embodiment of the invention.
Figure 7:
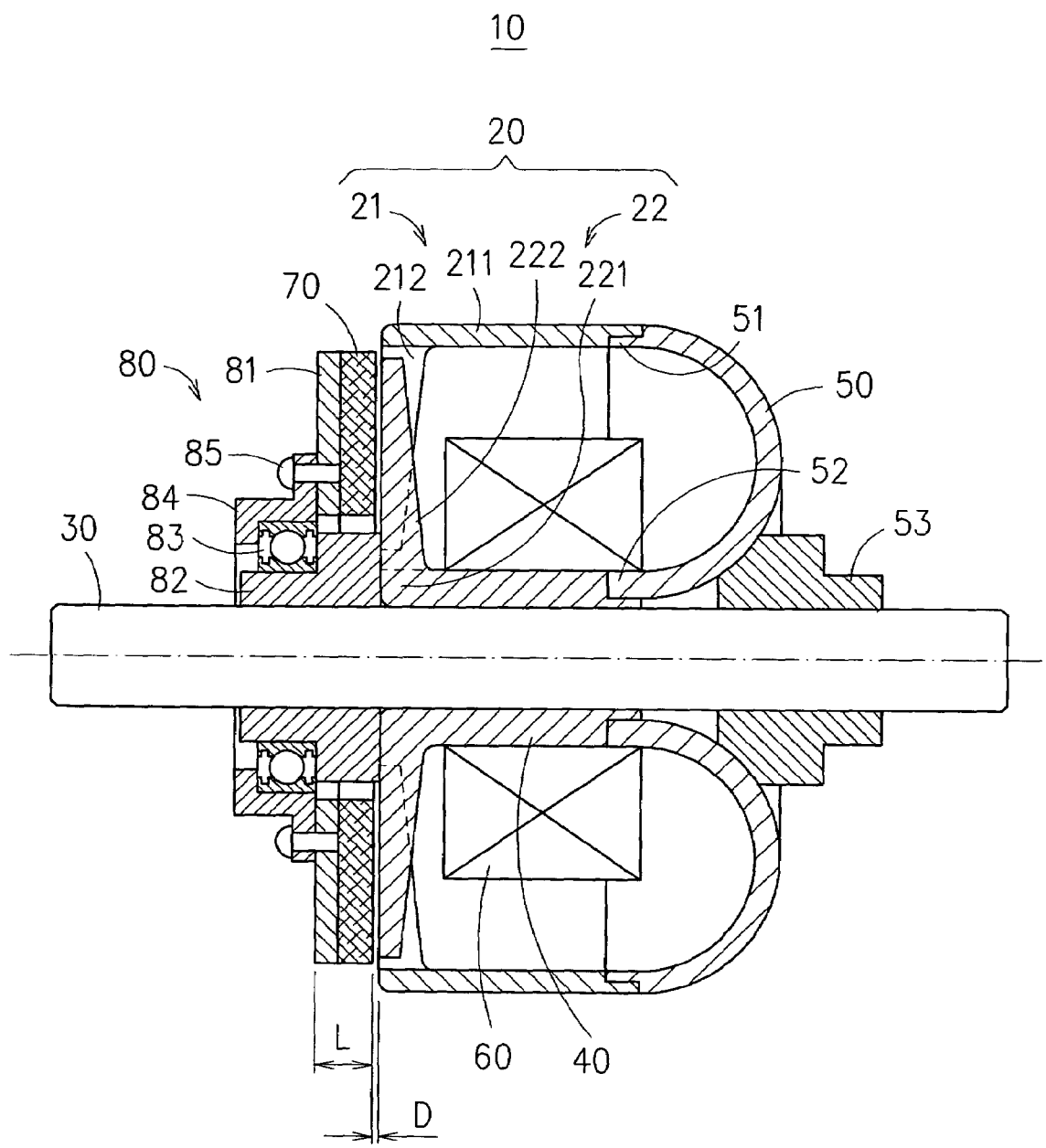
FIG. 7 is a sectional view of FIG. 6.
Figure 8:
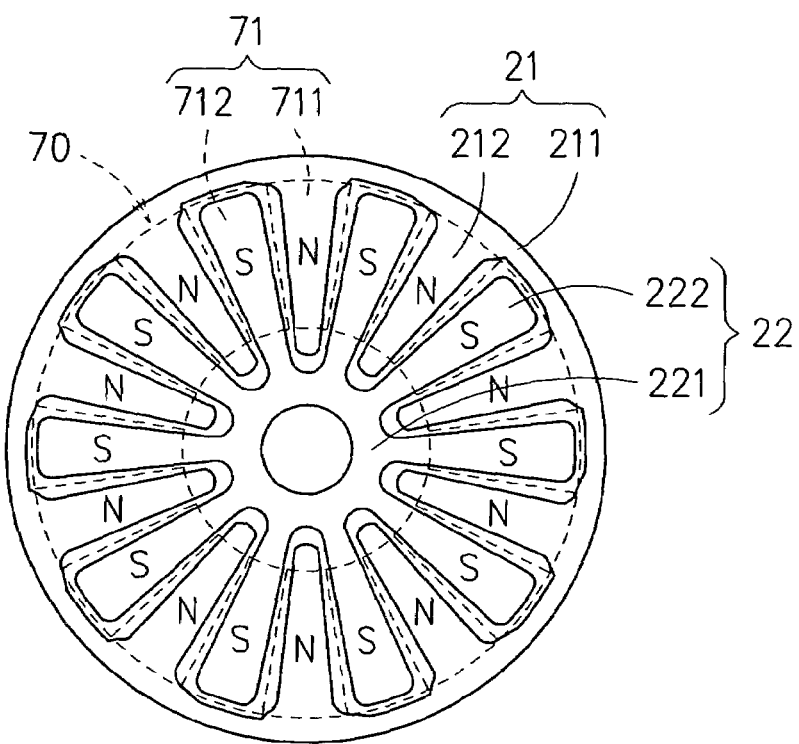
FIG. 8 is a front view of an electric generator of the invention depicting the interlacing of outer claw-poles and inner claw-poles.

Please refer to FIG. 6 to FIG. 8, which show an electric generator according to a first embodiment of the invention. The electric generator 10 is a single-sided magnet structure, which is primarily comprised of: a claw-pole set 20, a shaft 30, an iron core 40, an interfacing part 50, a solenoid coil 60, a magnet 70 and a back panel 80.

The claw-pole set 20 is composed of an outer claw-pole part 21 and an inner claw-pole part 22. Wherein, the outer claw-pole part 21 is used for constructing an outer magnetic circuit and is further comprised of an outer tube 211 and a plurality of outer claw-poles 212. The plural outer claw-poles are arranged at an axial end of the outer tube 211 while each extending from the edge of the outer tube 211 toward the axis of the same. In addition, the inner claw-pole part 22 is used or constructing an inner magnetic circuit and is further comprised of an inner tube 221 and a plurality of inner claw-poles 222. In this first preferred embodiment, the iron core 40 is integrally formed with the inner tube 222 that the iron core 40 can be treated as the inner tube 222 of the inner claw-pole part 22. The plural inner claw-poles 222 are arranged corresponding to the plural outer claw-poles 212 and are arranged at an axial end of the inner tube 221 while each extending outwardly and radially from the axle of the inner tube 221 for interlacing with the plural outer claw-poles 212. With regard to the shape and number of the inner/out claw-pole, please refer to FIG. 8. In FIG. 8, there are ten outer claw-poles 212 and ten inner claw-poles 222, whereas each outer claw-pole 212 is a cone-shape part tapering from the edge of the outer tube 211 toward the axial center of the same, and each inner claw-pole 222 is a fan-shaped part radially expanding outwardly from the edge of the inner tube 221, and thereby, the outer claw-poles 212 and the inner claw-poles 222 can be placed and oriented to interlace and fit to each other. It is noted that the shapes and dimensions, i.e. width, length and thickness, of each inner/outer claw-pole 212, 222 can be varied with respect to the voltage waveform intended to be generated and its manufacturing method. For instance, each claw can be shaped like a rectangular with its edge being rounded, or the thickness of each claw can be varied along the flowing direction of magnet flux in a manner that the thickness is reducing from the end thereof to the tip, or the thickness is maintained the same. As the claw-poles shown in FIG. 7, the thickness of each outer/inner claw-pole 212, 222 is gradually reducing from the portion connecting to the outer/inner tube 212, 222. Moreover, any of the inner claw-pole part 22 and outer claw-pole part 21 can be made of a material selected from the group consisting of iron, silicon iron, carbon steel, silicon steel and the combination thereof. Take one outer claw-pole 212 for instance, it can be integrally formed with the outer tube 211 by a processing method, such as stamping and casting, or it can be formed independent to the formation of the outer tube 211 whereas the two can thereafter be assembled by compactly ensheathing one inside the other. In another aspect, the outer claw-pole 212 can be a stacking of a plurality of silicon steel sheets that is lately integrally formed with the outer tube 211 by a process of plastic injection. The afore description is also true to the inner claw-pole 222 and the inner tube 221, only if the object formed therewith can allow magnetic flux to be conducted between two poles of opposite polarities.

As seen in FIG. 6 and FIG. 7, both the out tube 211 of the outer claw-pole part 21 and the inner tube 221 of the inner claw-pole part 22 are bored through the shaft 30. As the iron core 40 is axially connected to the inner tube 221, the iron core 40 can be mounted and ensheath the shaft 30. In addition, as the inner diameter of the outer tube 211 is larger than the outer diameter of the iron core 40, not only the interference between magnetic flux can be prevented, but also a space can be formed between the outer tube 211 and the iron core 40 to be used for receiving the solenoid coil 60 wrapping around the iron core 40.

Furthermore, the an interfacing part 50 can be substantially a ring structure which comprises: an inner side 52, axially connected to an axial end of the iron core 40 opposite to the inner claw-pole 222; and an outer side 51, axially connected to the an axial end of the out tube 211 opposite to the outer claw-pole 212; In addition, as the inner side 52 and the outer side 51 are interconnected with each other, the outer claw-pole part 21 is connected to the inner claw-pole part 11. It is noted that the interfacing part 50 can be integrally formed with the out tube 211 and the iron core 40, and then the integrated structure can be bonded with the outer claw-pole 212 and then the inner claw-pole 222. In a preferred aspect, a fixation cap 53 is arranged on a surface of the interfacing part 50, not proximate to the claw-pole set 20. By fixedly securing the fixation cap 53 onto the shaft 30 while enabling an end of the fixation cap 53 to abut against the interfacing part 50, the interfacing part 50, the outer tube 22 and the iron core 40 are forced to closely contact with each other.

As seen in FIG. 6 to FIG. 8, the magnet 70 is mounted on the shaft 30 at a position proximate to the outer/inner claw-poles 212, 222. It is noted that the magnet 70 can be substantially a flat magnet of disc shape or other geometrical shape, that the magnet 70 has more than two poles. As the dotted area shown in FIG. 8, the magnet 70 can be equiangularly divided into twenty poles 71, whereas there are ten north (N) poles 711 and ten south (S) poles 712, arranged in an alternating manner. In addition, the geometrical shape of each pole of the magnet 70 is conforming to that of the inner/outer claw-pole 212, 222, and the number of claws of the inner claw-pole 222 is the half of the number of the pole 71 while the outer claw-pole 212 is the same, i.e. ten outer claw-poles 212 and ten inner claw-poles 222. The magnet 40 is a multi-pole magnet made of a permeance material selected from the group consisting of NdFeB, SmCo, Hard Ferrite, AlNiCo, and the like. In addition, in order to avoid the adverse affect caused by the solenoid coil 60 being wrapped at a position not equally distant from the N pole 711 and the S pole 712, the magnet 70 is a multi-pole magnet of biased pole magnetization. Moreover, for those skilled in the art, the magnet 70 can be a single-sided magnet or a dual-sided magnet. When the inner/outer claw-pole 212, 222 is rotated radially by a helix angle, each pole 71 of the magnet 70 is twisted for magnetizing the pole with respect to the radius and angle of each pole. Further, a side of the claw-pole set 20 opposite to the magnet 70 is embedded with slender metal bars for attracting magnetic lines of the claw-pole set 20 to flow therethrough and thus causing comparatively stronger magnetic flux density to the solenoid coil 60.

In FIG. 6 and FIG. 7, a back panel 80 is arranged outside the magnet 70, which includes a flat disc-shape iron back 81. The iron back 81 is arranged at a side of the magnet 70 opposite to the outer/inner claw-pole 212, 222. Moreover, a fixation cap 82 is arranged at the center of integrated structure of the iron back 81 and the magnet 70, and is secured axially to the shaft 30. In addition to the fixation cap 82, a bearing 83 is further mounted on the shaft 30 while the bearing is further covered by a bearing cap 84, also being mounted on the shaft 30. The bearing cap 84 is screw-fixed to the iron back 81 by screws 85, and thus the magnet 70, the iron back 81, the bearing 83, the bearing cap 84, and the fixation cap 82 are assembled. An end of the fixation cap 82 facing toward the claw-pole set 20 is abutted against the inner tube 222 of the inner claw-pole part 22. As seen in FIG. 7, the fixation cap 82 is designed with an axial-extending length L, by which a distance D can be maintained between the magnet 70 and the outer/inner claw-pole 212, 222 when the fixation cap 82 is abutted against the inner tube 222. Thus, as the iron back 81 is arranged at a side of the magnet 70 opposite to that proximate to the claw-pole set 20, the iron back 81 is capable of enabling the closing of magnetic lines and thus reducing magnetic flux loss so that the magnetic flux density at the side of the claw-pole set 20 is increased. The iron back 81 is made of a permeance material selected from the group consisting of iron, ferro-cobalt alloy, Ni—Fe alloy, silicon iron and the combination thereof. By the disposition of the bearing 83, the magnet 70 is pivotally connected to the shaft 30. In addition, the coil 60, a plurality of the claw-pole set 20 and the magnet 70 can be serially mounted on the shaft 30 while arranging the iron back 81 outside the magnet 70 where it is far away from the interfacing part 50. Moreover, the iron back 81 and the bearing cap 84 can be integrally formed for simplicity.

By the combination of aforesaid components, a magnet circuit can be constructed within the magnet 70, the claw-pole set 20, and the iron core 40. When the magnet 70 is rotated relative to the rotation of the claw-pole set 20, the flowing direction of the magnet flux within the solenoid coil 60 is constantly changing between forward flowing and reverse flowing as the relative positions of the outer/inner claw-poles 212, 222 and the poles 70 of the magnet 70 are changing correspondingly. In a preferred aspect, when the outer/inner claw-poles 212, 222 complete one rotation with respect to the rotating magnet 70, the number of direction change of the magnet flux flowing inside the solenoid coil 60 is equal to the pole number of the magnet 70.

Figure 9:
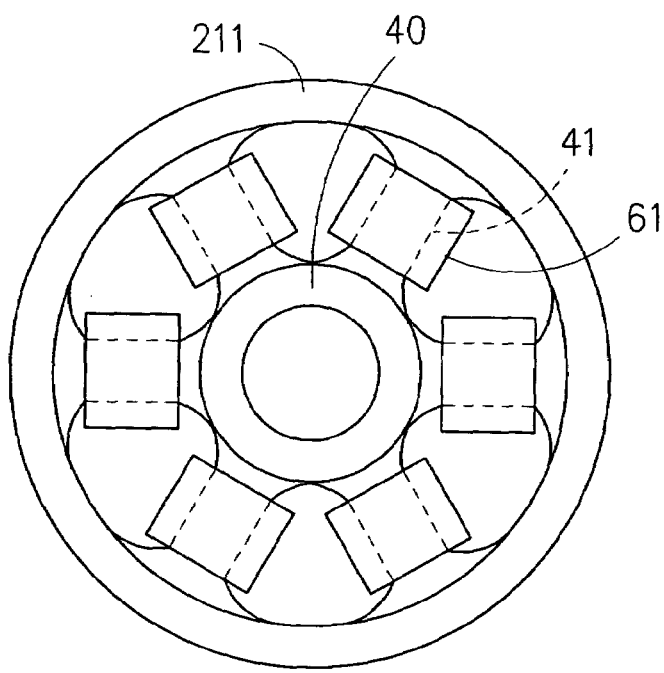
FIG. 9 is a schematic diagram illustrating the winding of a solenoid coil according to a preferred embodiment of the invention.

Please refer to FIG. 9, which is a schematic diagram illustrating the winding of a solenoid coil according to a preferred embodiment of the invention. In FIG. 9, a plurality of connecting parts 41, being interconnected with each other serially or in parallel by the coils wrapped respectively thereon, are arranged between the outer tube 211 and the iron core 40 for enabling electricity generated by the electric generator to be outputted. It is noted that each coil 61 is functioning similar to the solenoid coil 60, moreover, a portion of each coil 60 can be wrapped on a corresponding outer claw-pole 212, as the out claw-pole 212 shown in FIG. 6, so that the utilization of outer magnetic circuit is enhanced and thus the electricity generation is increased.

Figure 10:
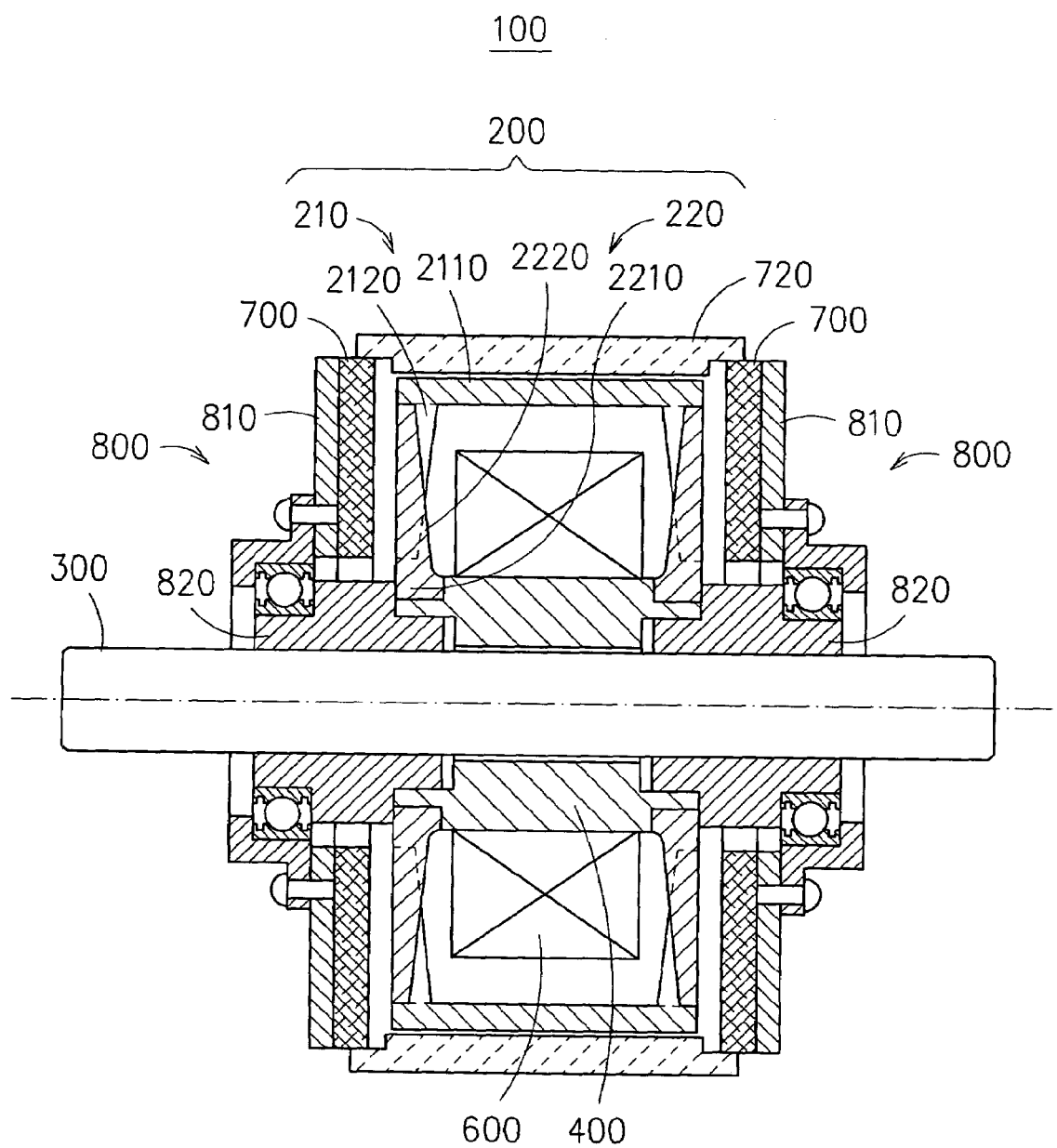
FIG. 10 is a sectional diagram depicting an electric generator according to a second preferred embodiment of the invention.

Please refer to FIG. 10, which is a sectional diagram depicting an electric generator according to a second preferred embodiment of the invention. In FIG. 10, the electric generator 100, being a dual-sided magnet structure, is an extension of the single-sided magnet structure 10 of FIG. 6. The electric generator 100 is primarily comprised of: a claw-pole set 200, a shaft 300, an iron core 400, a solenoid coil 600, two magnetic pieces 700 and two back panels 800. The functions of the aforesaid components are similar to those shown in FIG. 6, and thus are not described further herein. However, in this second preferred embodiment, each magnetic piece 700 is correspond to a set of out claw-poles 2120 and a set of inner claw-poles 2220, whereas the two sets of inner claw-poles 2220 are respectively connected axially to the two axial ends of the iron core 400 while one of the two magnetic pieces 700 is connected to an axial end of a hollow tube-like first connecting part 720 and another magnetic piece 700 is connected to another axial end, so that the two magnetic pieces 700 can be driven to rotate synchronously by the first connecting part 720; and an axial end of a second connecting part 2110 is connected to one of the two set of outer claw-poles 2120 while another axial end of the second connecting part 2110 is connected to another set of outer claw-poles 2120, so that the two outer claw-pole sets can be driven to rotate synchronously by the second connecting part 2110. In addition, a space is formed between the second connecting part 2110 and the iron core 400 for receiving the solenoid coil 600.

In this second preferred embodiment, the inner claw-pole sets 220 are mounted on the two axial ends of the iron core 400 by an ensheathing manner. However, they can be integrally formed with the iron core 400 as those shown in FIG. 6, in which the iron core 400 is acting as an inner tube shared by the two inner claw-pole sets 220. As for the interlacing arrangement of the outer claw-poles and the inner claw-poles, it is similar to that shown in FIG. 8. In addition, a plurality of the coil 600, the claw-pole sets 200 and the magnetic pieces 700 can be serially mounted on the shaft 300 while sandwiching one magnetic piece 700 between one claw-pole set 200 and it corresponding solenoid coil set 600 and only arranging one iron back 810 outside the outer-most magnetic piece 700 while no iron back 810 is needed for those magnetic pieces 700 in the middle.

Figure 11A:
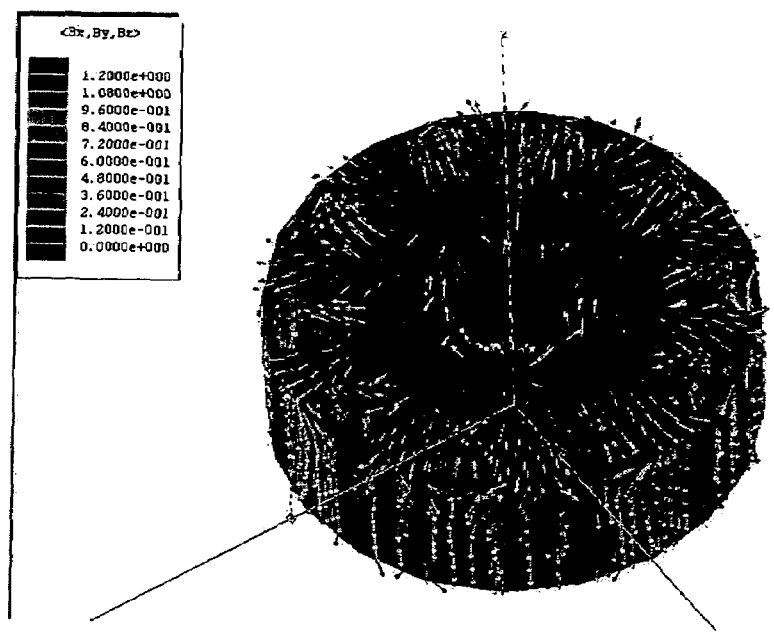
FIG. 11A is a simulated diagram showing the distribution of magnetic flux density on a single-sided magnet of an electric generator of the invention while the electric generator is operating at 30 RPM.
Figure 11B:
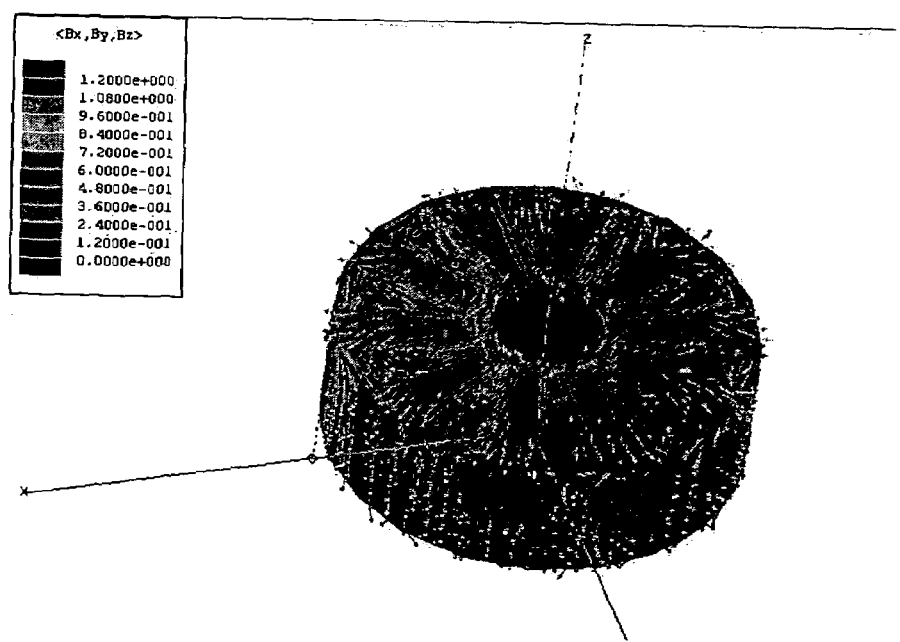
FIG. 11B is a simulated diagram showing the distribution of magnetic flux density on a single-sided magnet of an electric generator of the invention while the electric generator is operating at 120 RPM as the size and claw-pole number of the electric generator is restricted by an exemplification.
Figure 12A:
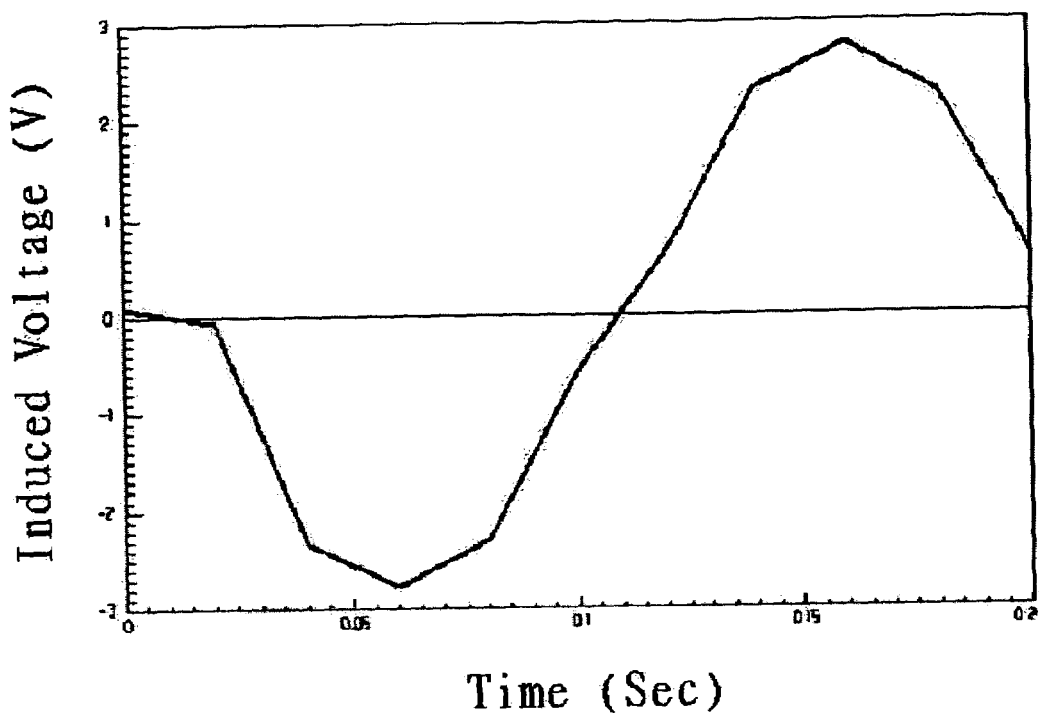
FIG. 12A shows a waveform of induced voltage, whereas a single-sided magnet of an electric generator of the invention is operating at 30 RPM.
Figure 12B:
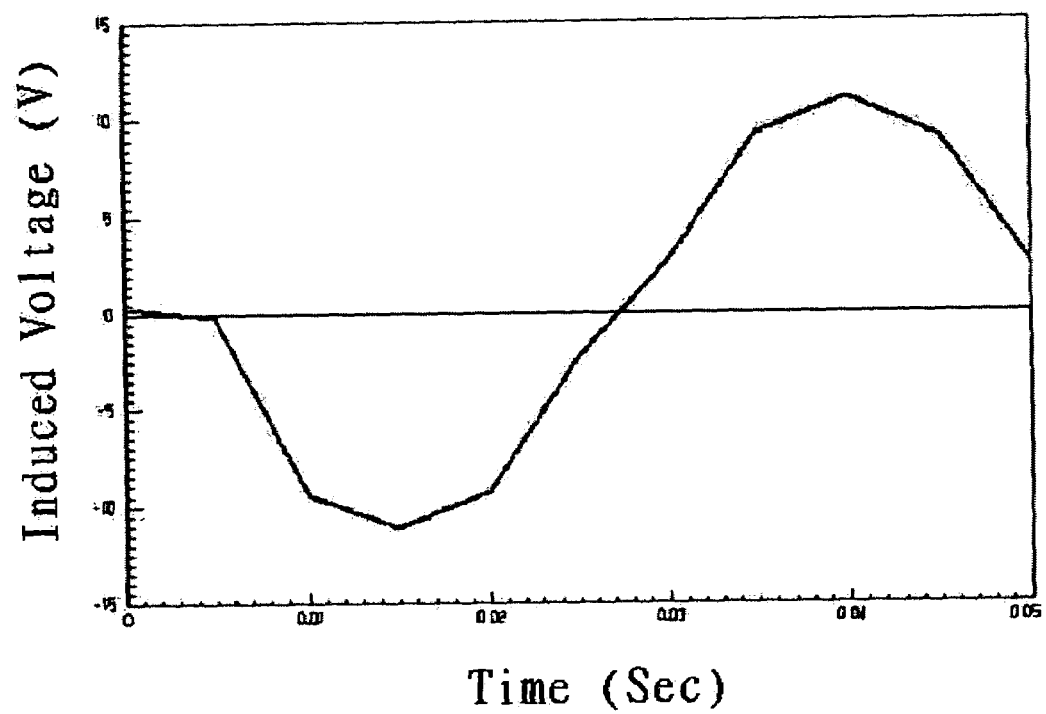
FIG. 12B shows a waveform of induced voltage, whereas a single-sided magnet of an electric generator of the invention is operating at 120 RPM.
Figure 13A:
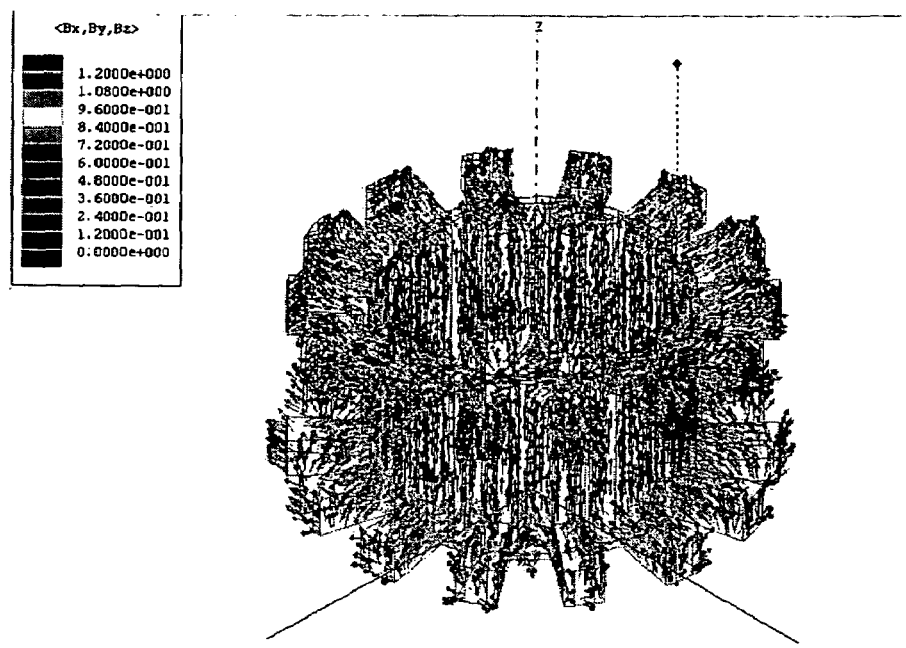
FIG. 13A is a simulated diagram showing the distribution of magnetic flux density on a dual-sided magnet of an electric generator of the invention while the electric generator is operating at 60 RPM.
Figure 13B:
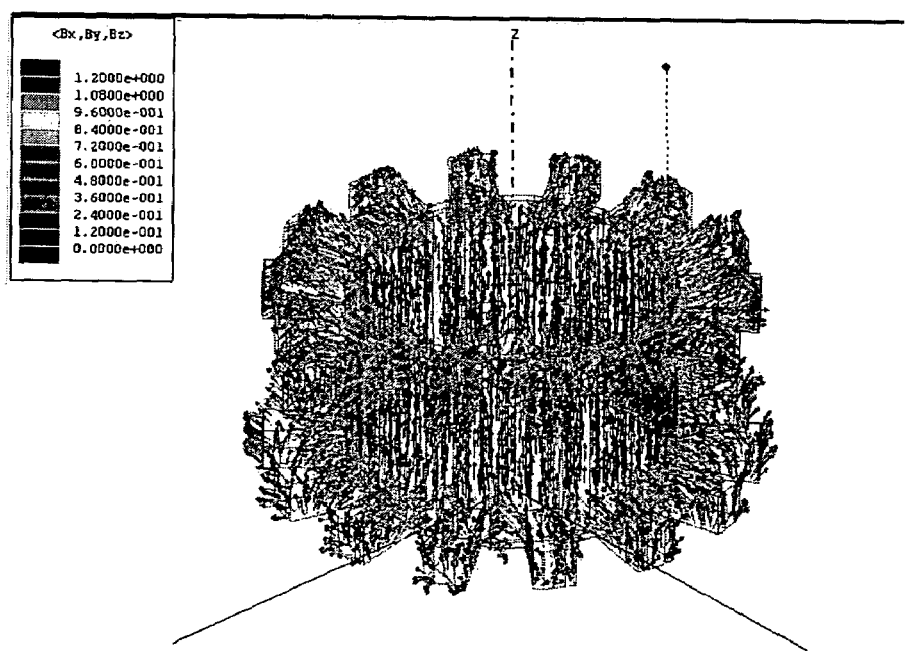
FIG. 13B is a simulated diagram showing the distribution of magnetic flux density on a dual-sided magnet of an electric generator of the invention while the electric generator is operating at 90 RPM.
Figure 14A:
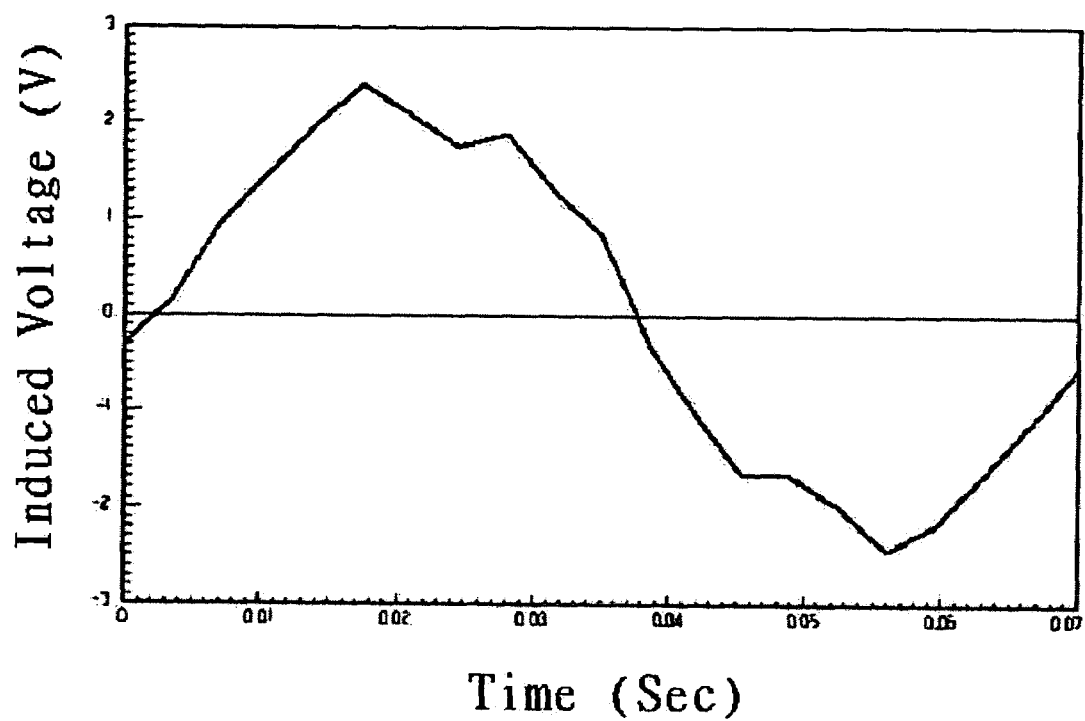
FIG. 14A shows a waveform of induced voltage, whereas a dual-sided magnet of an electric generator of the invention is operating at 60 RPM.
Figure 14B:
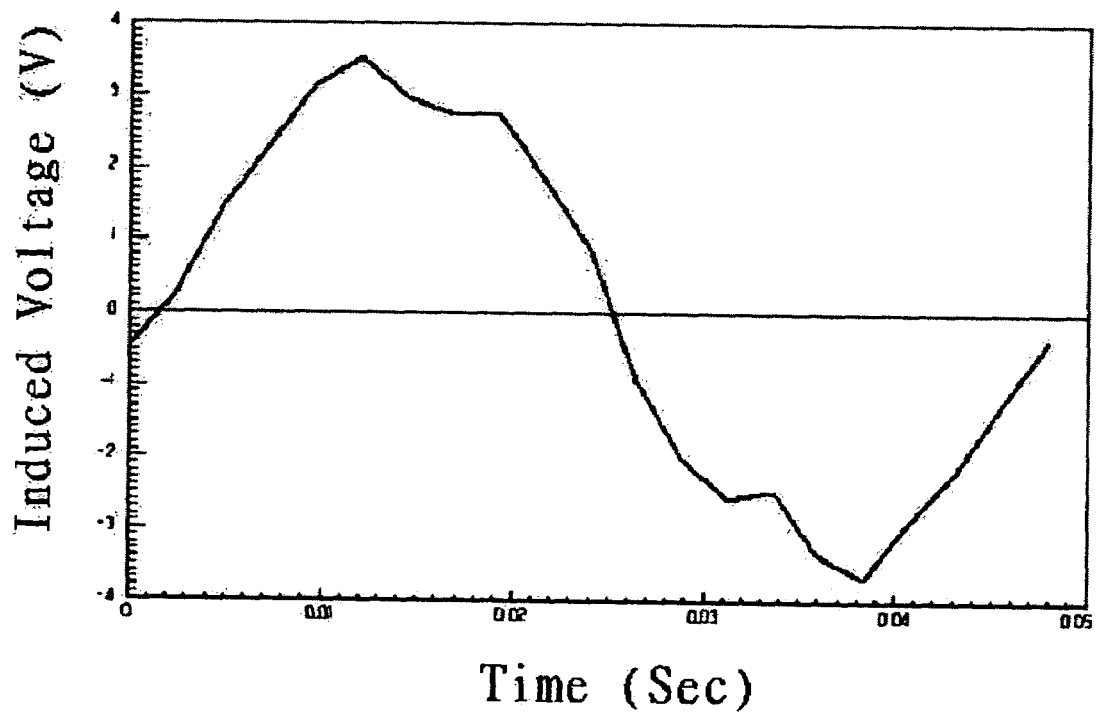
FIG. 14B shows a waveform of induced voltage, whereas a dual-sided magnet of an electric generator of the invention is operating at 90 RPM.

Please refer to FIG. 11A to FIG. 14B, which are simulations performed by ANSOFT for evaluating the performance of an electric generator of the invention under different rotation speed. As seen in FIG. 11A and FIG. 11B, which are simulated diagrams showing the distributions of magnetic flux density on a single-sided magnet of an electric generator of the invention while the electric generator is operating at 30 RPM and at 120 RPM, the magnetic flux density at the iron core is far more saturated comparing to those at the claw-poles. FIG. 12A and FIG. 12B show respectively a waveform of induced voltage, whereas a single-sided magnet of an electric generator of the invention is operating at 30 RPM and a waveform of 120 RPM. Moreover, as seen in FIG. 13A and FIG. 13B, which are simulated diagrams showing the distributions of magnetic flux density on a dual-sided magnet of an electric generator of the invention while the electric generator is operating at 60 RPM and 90 RPM, the magnetic flux densities at the iron core on both account are all saturated which demonstrates that the pat of magnetic flux of a dual-sided magnetic structure is comparatively shorter and thus the transmission efficiency is preferred. FIG. 14A and FIG. 14B show respectively a waveform of induced voltage, whereas a single-sided magnet of an electric generator of the invention is operating at 60 RPM and a waveform of 90 RPM. From the simulation disclosed above, the efficiency of the electric generator of the invention can be verified.

Figures 15A, 15B:
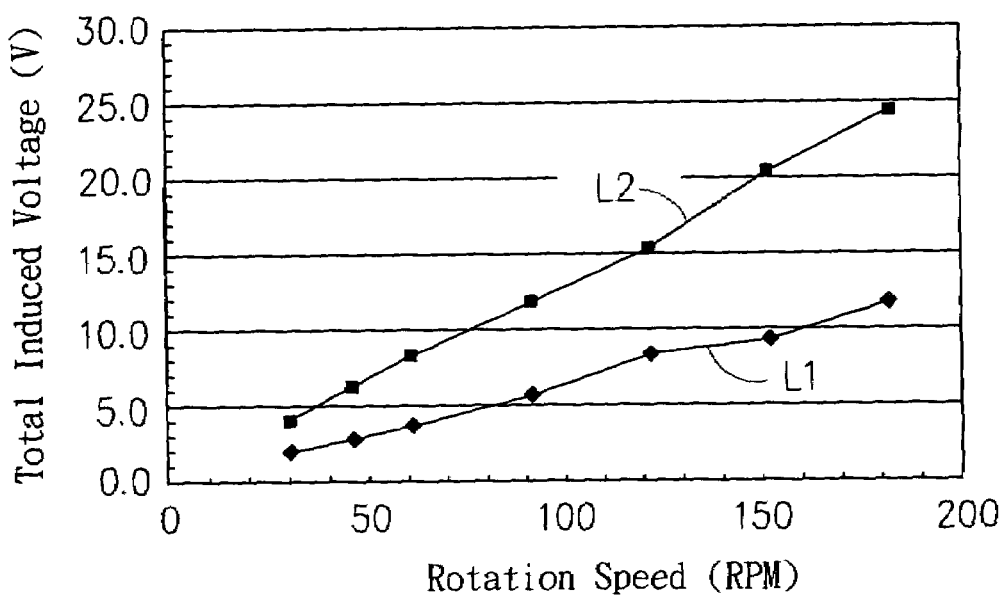
FIG. 15A is a table showing the performance comparison of various electric generators of the invention.
FIG. 15B shows performances of an electric generator of single-side magnet and another electric generator of dual-side magnet by depicting the changing of the induced voltages with respect to rotation speed.

Please refer to FIG. 15A and FIG. 15 B, which are respectively a table showing the performance comparison of various electric generators of the invention and a diagram showing performances of an electric generator of single-side magnet and another electric generator of dual-side magnet by depicting the changing of the induced voltages with respect to rotation speed. In these two figures, it is noted that, under the same rotation speed, the induced voltages obtained from a single-sides magnetic structure and a dual-sided magnetic structure are not the same. Nevertheless, both is quite capable of achieving a required voltage, but under different rotation speeds. In FIG. 15B, curve L1 represents the variation of total induced voltage acquired from a single-sided magnetic structure operating at different rotation speed; and curve L2 represents the variation of total induced voltage acquired from a dual-sided magnetic structure operating at different rotation speed. While applying the electric generator as a hub-type dynamo of a bicycle, the power density can achieve 45 mW/cm3 while operating at 150 RPM. While applying the electric generator on a fitness bicycle, the power density can achieve 40 mW/cm3 while operating at 500 RPM.

To sum up, the electric generator of the invention has advantages list as following:

(1) As the magnetization direction of a flat disc-shaped magnet of the invention is parallel to the axial direction of the iron core, the corresponding magnetic lines are directed to the iron core effectively as they are deflected only once after the magnetic lines are received into the inner/outer claw-poles, so that less magnet is required in the electric generator of the invention, and thus the overall appearance of the invention can be flattened that is suitable for certain specific applications of limited space available.

Figure 1:
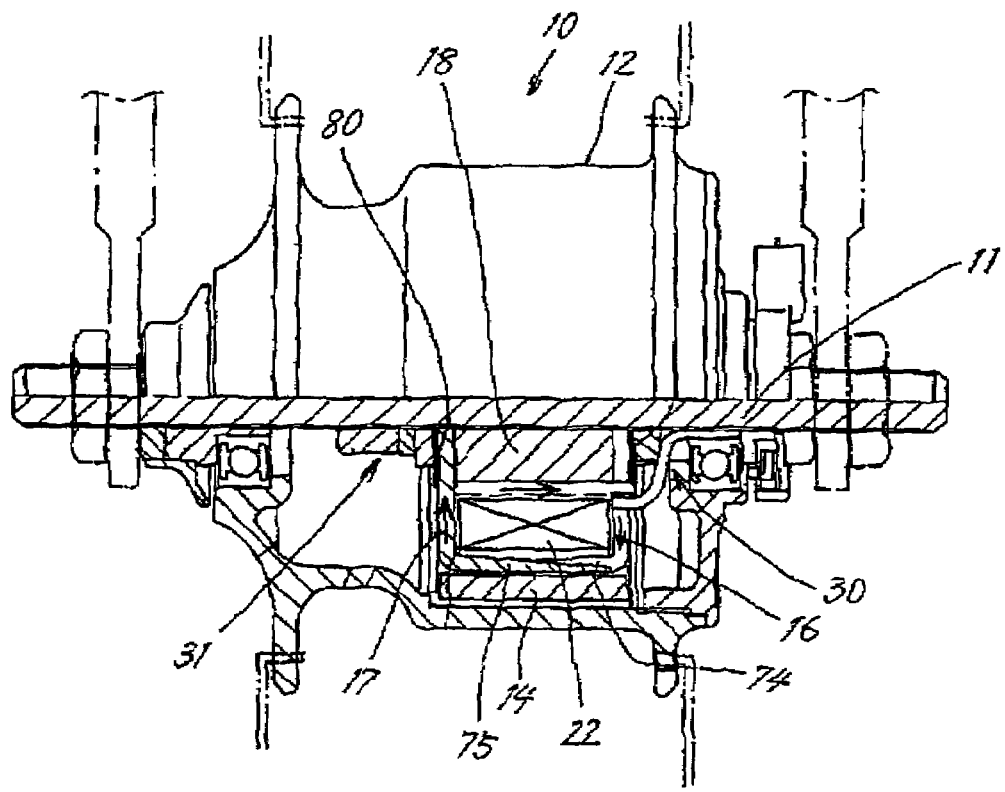
FIG. 1 is a sectional view of a conventional hub-type dynamo.
Figure 2:
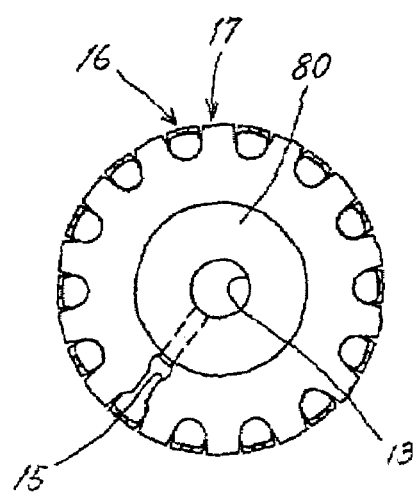
FIG. 2 is a left side view of a stator of the conventional hub-type dynamo shown in FIG. 1.
Figure 3:
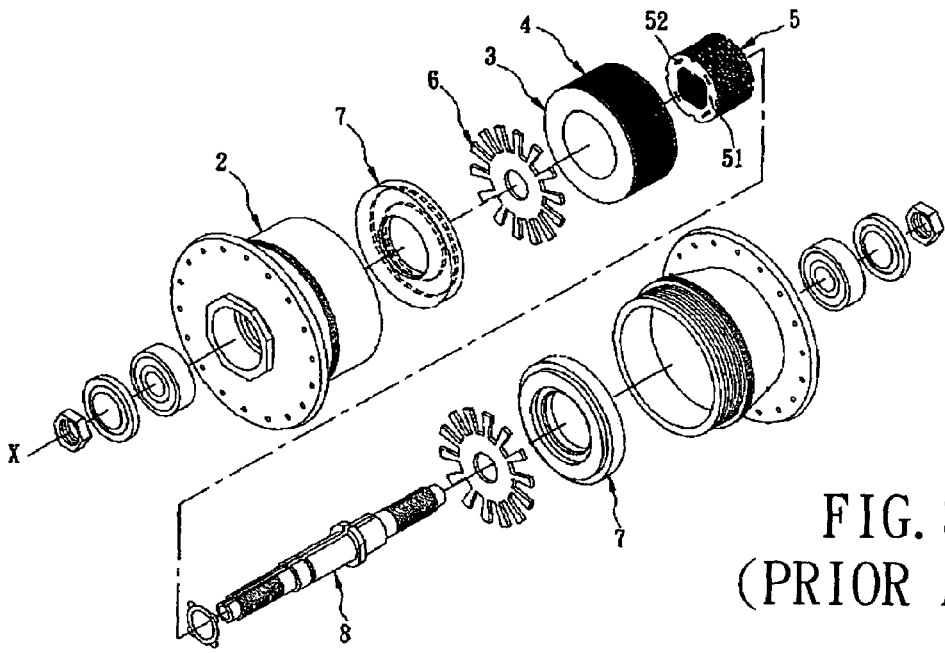
FIG. 3 shows a hub-type dynamo disclosed in TW Pat. No. 92137088.
Figure 4:
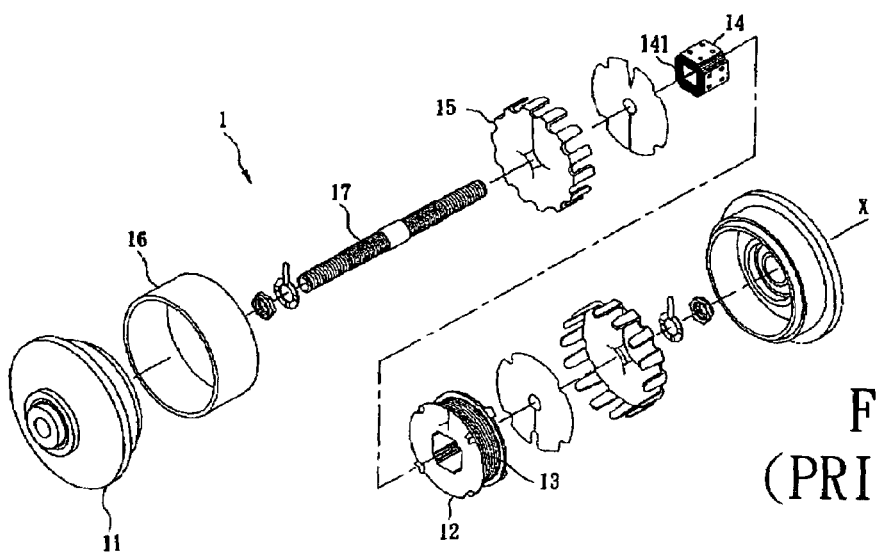
FIG. 4 shows a conventional hub-type dynamo disclosed in TW Pat. No. 92137088.
Figure 5:
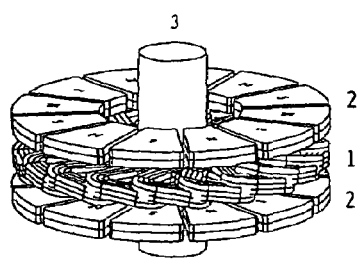
FIG. 5 shows a flat rotary electric generator disclosed in U.S. Pub. No.

(2) In the electric generator of the invention, the magnetic lines are guided effectively to flow inside the solenoid coil by the design of the flat disc-shaped magnet and the inner/outer claw-pole sets, and the flowing direction of the magnet flux within the solenoid coil is constantly changing between forward flowing and reverse flowing as the relative positions of the outer/inner claw-pole sets and the poles of the multi-pole magnet are changing correspondingly to the rotation of the multi-pole magnet, the magnetic flux of the solenoid coil is changed with respect to time that is totally different to the conventional method of cutting the magnetic line perpendicularly, as that shown in FIG. 3, by which not only the induced voltage output efficiency is increase, but also the magnetic resistance is reduced.

(3) As all the magnetic lines passing the claw-poles are all being guided into the iron core, the number of solenoid coils required can be reduced. Moreover, by the use of only a single solenoid coil, the residue magnetic flux on the surface of the magnet can be utilized effectively.

(4) The flat disc-shape magnet can be magnetized easily.

(5) The electric generator of the invention can have low resistance and high conversion efficiency.

(6) The electric generator of the invention can have good voltage performance even while operating at comparatively low rotation speed.

(7) The electric generator of the invention is compact and light-weighted.

(8) The electric generator of the invention is simple in structure and low cost.

While the preferred embodiment of the invention has been set forth for the purpose of disclosure, modifications of the disclosed embodiment of the invention as well as other embodiments thereof may occur to those skilled in the art. Accordingly, the appended claims are intended to cover all embodiments which do not depart from the spirit and scope of the invention.

What is claimed is:

1. An electric generator, comprising:
    at least a magnet, each having more than two poles;
    at least a claw-pole set, each being composed of an inner claw-pole and an outer claw-pole;
    an iron core, connected to each inner claw-pole for enabling loops of the inner claw-poles and the outer claw-poles to be conducted;
    a solenoid coil, winding on the outside of the iron core; and
    at least a back panel, each back panel having:
    an iron back, arranged at a side of the magnet opposite to that proximate to the claw-pole set, for enabling the closing of magnetic lines;
    a fixation cap, axially arranged at the center of the iron back and the magnet while enabling an end of the fixation cap to abut against the iron core;
    a bearing, ensheathing the fixation cap; and
    a bearing cap, wrapping the bearing,
    wherein the bearing cap is screw-fixed to the iron back by screws, and thus the magnet, the iron back, the bearing, the bearing cap, and the fixation cap are assembled, and
    wherein, the inner claw-pole and the outer claw-pole are interlaced arranged and used for guiding magnetic flux.

2. The electric generator of claim 1, wherein each magnet is a flat disc with a plurality of poles, each being arranged at a radial section while surrounding the center of the disc.

3. The electric generator of claim 1, wherein the outer diameter of the iron core is smaller than that of the magnet and each inner claw-pole extends outwardly and radially from the iron core.

4. The electric generator of claim 1, wherein each magnet is independently arranged, and an interfacing part is substantially a ring structure having an inner side connected to the iron core and an outer side connected to the outer claw-pole, while the inner side and the outer side are interconnected with each other, thereby, a magnetic circuit is formed by the magnet, the iron core, the inner claw-pole and the outer claw-pole.

5. The electric generator of claim 4, wherein a space is formed between the inner side and the outer side of the interfacing ring and used for receiving the solenoid coil.

6. The electric generator of claim 4, wherein each magnet is a multi-pole magnet of biased pole magnetization.

7. The electric generator of claim 1, wherein each claw-pole set and the iron core are respectively made of a material selected from the group consisting of iron, silicon iron, silicon steel, and the combination thereof.

8. The electric generator of claim 1, wherein the inner claw-pole and the outer claw-pole are integrally formed/stacking formed with an inner/outer tube by a metallic process selected from the group consisting of a stamping process, a casting process.

9. The electric generator of claim 1, wherein any one of the outer claw-pole and the inner claw-pole is a stacking of a plurality of silicon steel sheets.

10. The electric generator of claim 1, wherein the width, length and thickness of different inner/outer claw-poles are different; and the width, length and thickness of the inner claw-pole and the outer claw-pole of the same claw-pole set can be different.

11. The electric generator of claim 10, wherein the outer claw-pole is a cone-shape part tapering from the edge of the outer tube toward the axial center of the same; and the inner claw-pole is a fan-shaped part radially expanding from the edge of the inner tube.

12. The electric generator of claim 1, wherein the magnet is a multi-pole magnet made of a permeance material selected from the group consisting of NdFeB, SmCo, Ferric oxide, AlNiCo, and the like.

13. The electric generator of claim 1, wherein the number of claws of the inner claw-pole is the half of the pole number of the magnet while the outer claw-pole is the same.

14. The electric generator of claim 1, wherein the magnet is selected from the group consisting of a single-sided magnet and a dual-sided magnet.

15. The electric generator of claim 1, wherein the geometrical shape of each pole of the magnet is conforming to that of the inner/outer claw-pole.

16. The electric generator of claim 1, wherein the fixation cap is axially extending by a specific length for enabling the same to abut against the iron core while maintaining the magnet to be spaced from the inner/outer claw-pole by a specific distance.

17. The electric generator of claim 1, wherein the iron back is made of a permeance material selected from the group consisting of iron, ferro-cobalt alloy, Ni—Fe alloy, silicon iron and the combination thereof.

18. The electric generator of claim 1, wherein the at least one claw-pole set are serially connected while the at least one back panel are axially arranged at the two outer sides of the magnet.

19. The electric generator of claim 1, wherein the iron back and the bearing cap are integrally formed.

20. The electric generator of claim 1, wherein a plurality of connecting parts, being interconnected with each other serially or in parallel, are arranged between the outer claw-pole and the iron core for enabling electricity generated by the electric generator to be outputted.

21. The electric generator of claim 20, wherein each connecting part is made of a material selected from the group consisting of iron, silicon iron, silicon steel and the combination thereof.

22. A electric generator, comprising:
   at least a magnet, each having more than two poles;
   at least a claw-pole set, each being composed of an inner claw-pole and an outer claw-pole;
   an iron core, connected to each inner claw-pole for enabling loops of the inner claw-poles and the outer claw-poles to be conducted;
   a solenoid coil, winding on the outside of the iron core;
   wherein, the inner claw-pole and the outer claw-pole are interlaced arranged and used for guiding magnetic flux,
   wherein each magnet is composed of two magnetic pieces, being spaced apart by an interval while enabling each to correspond to one claw-pole set, and
   wherein one of the two magnetic pieces is connected to an axial end of a hollow tube-like first connecting part while another magnetic piece is connected to another axial end, so that the two magnetic pieces can be driven to rotate synchronously by the first connecting part; and an axial end of a second connecting part is connected to the outer claw-pole of one claw-pole set of the at least a claw-pole set while another axial end of the second connecting part is connected to the outer claw-pole of another claw-pole set of the at least a claw-pole set, so that the two outer claw-poles can be driven to rotate synchronously by the second connecting part; and the outer diameter of the second connecting part is smaller than the inner diameter of the first connecting part.

23. The electric generator of claim 22, wherein a space is formed between the second connecting part and the iron core and used for receiving the solenoid coil.

* * * * *